April 5, 1949.  A. P. ALGIER  2,466,295
CONNECTING MEANS FOR PIVOTED ROTARY CLOSURES
Filed Aug. 4, 1944
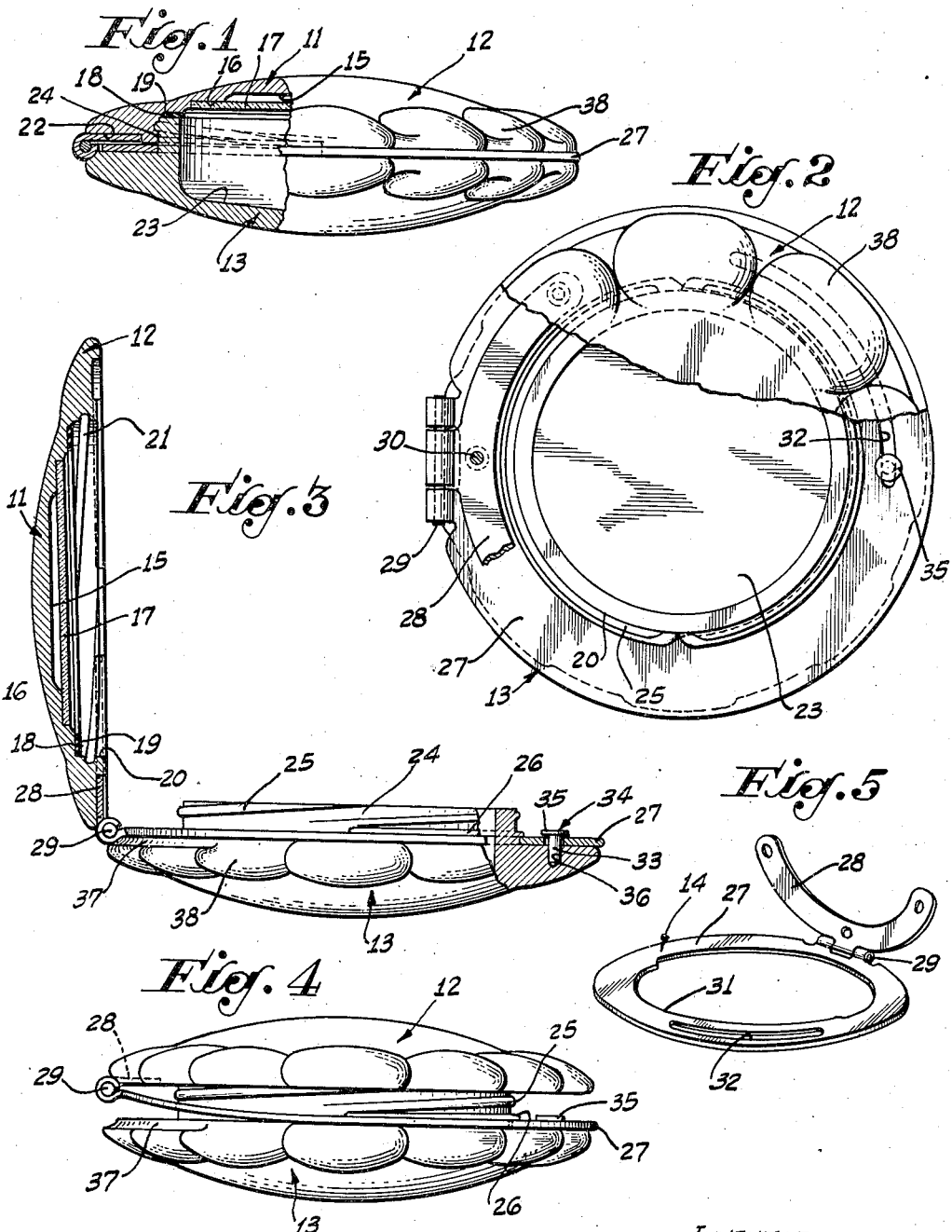
INVENTOR
ALLEN P. ALGIER
BY
HARRIS, KIECH, FOSTER & HARRIS
For THE FIRM
ATTORNEYS

Patented Apr. 5, 1949

2,466,295

UNITED STATES PATENT OFFICE 2,466,295

CONNECTING MEANS FOR PIVOTED ROTARY CLOSURES

Allen P. Algier, Los Angeles, Calif., assignor to Ward D. Foster, Glendale, Calif.

Application August 4, 1944, Serial No. 548,013

8 Claims. (Cl. 220—30.5)

My invention relates to means by which two members may be securely locked together and which is adapted upon relative rotation of such members to release them for swinging movement relative to each other while retaining them connected together.

Since my invention finds particular utility in forms adapted for so connecting a lid, cap, or closure to a container, wall, or base, a form adapted for connecting a lid or closure to a base or receptacle of a vanity case is hereinafter illustrated and described, it being understood that my invention is not limited to such use.

Objects of my invention include the provision of a case including a lid and a base with means connecting them so that they may upon relative rotation be locked together with any desired degree of pressural contact so as to effectively prevent the escape of fluids and solids from and the entry of fluids and solids into the interior thereof. In accordance with my invention this object is accomplished by moving the lid and the base toward each other at a rate which is relatively slow and wholly controlled by the operator, so that the ejection of a portion of the contents by the sudden expulsion of air occasioned by snapping the lid and base together is entirely eliminated.

Another object of my invention is the provision of such a lid and base and such connecting means in which the lid may be readily unlocked from the base by their relative rotation and thereafter swung relative to the base to expose the interior of both the lid and the base while retaining the lid secured to the base against separation therefrom.

Still another object of my invention is the provision of such a device which is inexpensive in fabrication, easy of assembly, positive and long-lived in its operation, and sightly in appearance.

Embodiments of my invention capable of performing the foregoing objects and others are described in the following specification, which may be more readily understood by reference to the accompanying drawing which Fig. 1 is a side elevational view partially sectioned of one embodiment of my invention;

Fig. 2 is a plan view partially sectioned of the compact illustrated in Fig. 1;

Fig. 3 is a side elevational view partially sectioned illustrating the lid in open position;

Fg. 4 is a side elevational view illustrating the positions of the lid and the base at the beginning of the operation of locking them together; and Fig. 5 is a perspective view of the connecting member forming part of my invention.

Referring to the drawing, which is for illustrative purposes only, the numeral 11 indicates a compact which includes a lid 12, a base 13, and a connecting member 14. The lid 12 is convex on its outer surface and provided with an inner concentric cavity 15, including adjacent its outer wall a cylindrical portion 16 in which a mirror 17 is mounted in any suitable manner. The cavity 15 includes also an enlarged cylindrical portion 18 inwardly of and of greater diameter than the cylindrical portion 16.

A packing ring 19 of suitable material, such as rubber, neoprene, paper, leather, or the like, is suitably secured in the enlarged cylindrical portion 18. The cavity 15 includes also an innermost cylindrical portion 20. Formed in the innermost cylindrical portion 20 in a plurality of engaging means which is the embodiment illustrated are grooves or ways 21 in the form of threads. An arcuate recess 22 is formed on the inner surface of the lid 12 adjacent its periphery for a purpose which will later appear.

The base 13 is provided with an inner cavity 23 for the reception of powder and a puff. Formed around the cavity 23 is an inwardly extending annular flange 24 upon which there is formed a plurality of engaging members which in the embodiments illustrated in the drawing are in the form of threads 25 adapted for the reception of the ways 21. Also formed upon the annular flange 24 adjacent and spaced a short distance from the base 13 is a semiannular projection 26.

The connecting member 14 includes a base section 27 and a lid section 28 secured together by a hinge 29 in such manner as to permit their relative swinging movement. The lid section 28 is arcuate in form and adapted to be received within the arcuate recess 22 of the lid 12 and to be secured in place by screws 30. The lid section 28 is of a thickness substantially equal to the depth of the arcuate recess 22 so that, when installed, its inner surface is substantially flush with the inner surface of the lid 12.

The base section 27 is in the form of an annulus having a portion 31 of greater radial width than the remainder thereof. The portion 31 is preferably diametrically opposite the hinge 29 and preferably extends through a substantial portion of the periphery of the base section 27, as, for example, about 180°. The extent of the portion 31 of the base section 27 and the peripheral extent of the semiannular projection 26 are so related that the base section 27 may be positioned upon the inner surface of the base 13 around the annular flange 24 and then rotated relative to the base 13 so that the enlarged portion 31 passes under the semiannular projection 26 to secure the connecting member 24 against removal from the base 13.

An arcuate slot 32 is formed in the portion 31 of the base section 27 and is adapted for the reception of a shank 33 of a pin 34 having a head 35 for engagement with the upper surface of the base section 27.

A cylindrical opening 36 is formed in the base 13 for the reception of the shank 33 of the pin 34. The shank 33 is secured in the cylindrical opening 36 by friction or a suitable cement or, if the pin and base be of plastic, by a suitable bond between the materials of which they are formed. The slot 32 is made of such dimensions relative to the shank 33 as to permit the base section 27 to rotate freely relative to the base 13 to the extent defined by the peripheral dimension of the slot 32.

The upper edge of the base 13 is cut away, as indicated by the numeral 37, to receive the hinge 29 during the rotation of the base section 27 relative to the base 13 to the extent defined.

With the lid 12 in open position, as illustrated in Fig. 3, the contents of the cavity 23 in the base are accessible for use, as is the mirror 17 in the lid 12. When it is desired to close the compact 11, the lid 12 is swung upon the hinge 29 to a position adjacent and with its inner face parallel to the inner face of the base 13, as illustrated in Fig. 4. In this position the threads 25 and the ways 21 are disposed for interengagement. Likewise, when the lid 12 and base 13 are in this position, the portion of the base section 27 opposite the portion 31 and adjacent the hinge 29 is deformed, the base section 27 being formed of thin metal or other suitable material to permit such deformation.

With the lid 12 and base 13 in the positions illustrated in Fig. 4 they are rotated relative to each other, thus bringing them into their closed and locked positions as illustrated in Fig. 1. The speed at which the lid 12 and base 13 are brought into this closed position is entirely controlled by the operator, may be very gradual, and insufficient to cause the rapid expulsion of air from the interior of the compact 11. During such closing operation, the connecting member 14 rotates with the lid 12 relative to the base 13. The interior of the compact 11 may be sealed fluid-tight when the lid 12 and base 13 are in the position illustrated in Fig. 1, the engagement of the inner surface of the lid 12 with the inner surface of the base section 27, the engagement of the annular flange 24 of the base 13 with the innermost cylindrical portion 20 of the cavity 15 of the lid 12, the engagement of the threads 25 of the base 13 with the ways 21 of the lid 12, and the engagement of the inner end of the annular flange 24 of the base 13 with the packing ring 19 of the lid 12 all contributing to this sealed relationship.

The lid 12 and base 13 may be formed in any desired manner to facilitate their grasping by the hands of the operator to rotate them to the desired peripheral contact with each other; for example, the lid 12 and base 13 may be made non-circular in outline, or they may be formed with cavities having projecting rims 38 in their outer surfaces adjacent the periphery thereof, as illustrated in the drawing.

In opening the compact the hereinbefore described operation is merely reversed.

The lid 12 and base 13 may with advantage be formed of any suitable plastic or material, and the connecting member 14 may be made by stamping or other suitable procedure from metal or any suitable material.

From the foregoing it will be apparent that the embodiment of my invention hereinbefore described accomplishes all of the objects primarily stated.

My invention may, however, be embodied in various other forms, which will occur to those skilled in the art, and I therefore wish my invention to be not restricted to the specific embodiment hereinbefore illustrated and described, but as including all the variations thereof coming within the scope of the claims which follow.

I claim as my invention:

1. In a compact the combination of: a base member having an opening therein; a lid member covering the opening in said base member; primary cam means associated with said base member; secondary cam means associated with said lid member, said primary and secondary cam means locking said lid member to said base member and releasing said lid member from said base member upon limited relative rotation of said lid member and said base member in opposite directions; a first section attached to one of said members; a second section having a projecting portion; means connecting said sections for relative swinging movement thereof; an engaging means associated with said other member, engaging said projecting portion of said section, securing together said other member and said second section during said limited rotation, and releasing said other member from said section upon further rotation; and stop means associated with said other member, limiting the relative rotation of said second section and said other member, and preventing the release of said other member from said second section.

2. In a compact, the combination of: a base member having an opening therein; a lid member covering the opening in said base member; primary cam means associated with said base member; secondary cam means associated with said lid member, said primary and secondary cam means locking said lid member to said base member and releasing said lid member from said base member upon limited relative rotation of said lid member and said base member in opposite directions; a first section fixedly attached to one of said members; a second section having an arcuate projecting portion; means connecting said sections for relative swinging movement thereof; and arcuate engaging means associated with said other member, engaging said arcuate projecting portion of said second section, securing together said other member and said second section during said limited rotation, and releasing said other member from said section upon further rotation.

3. In a compact, the combination of: a base member having an opening therein; a lid member covering the opening in said base member; primary thread means associated with said base member; secondary thread means associated with said lid member, said primary and secondary thread means locking said lid member to said base member, and releasing said lid member from said base member upon limited rotation of said lid member and said base member; a first curved section fixedly attached to the rim of one of said members; a second section; hinge means connecting said sections for relative swinging movement; means securing said second section to the other of said members for rotation relative thereto whereby said lid member may be locked to and released from said base member without detachment of said other member from said second section; and stop means on said other member, limiting the relative rotation of said second section and said other member.

4. In apparatus for releasably locking together a first and a second member, the combination of:

cam means associated with said members, and securing together and releasing said members upon relative rotation thereof in opposite directions; connecting means including a first section fixedly attached to the rim of said first member, a second section which is deformable by relative movement of said members, and hinge means connecting said sections for relative swinging movement thereof; means connecting said second section to said second member for relative rotation thereof, whereby said second member may rotate relative to said first member and said connecting means between a position in which said cam means locks said members together and a position in which said members are released for relative swinging movement thereof and in which said cam means are disposed for reengagement; and means for limiting the relative rotation between said second section and said second member.

5. In apparatus for releasably locking together a first and a second member, the combination of: interengaging means associated with said members, securing together and releasing said members upon relative rotation thereof in opposite directions; connecting means including a first section attached to said first member, a second section which is deformable by closing of said compact, and hinge means connecting said sections for relative swinging movement thereof; and means connecting said second section to said second member for limited relative rotation thereof, whereby said second member may rotate relative to said first member and said connecting means between a position in which said interengaging means locks said members together and a position in which said members are released for relative swinging movement thereof, said sections being in contact when said members are locked together.

6. In a device for connecting two members locking together and releasing upon relative rotation in opposite directions, the combination of: a first section fixedly attached to one of said members; a second section which is deformable by bringing together said members; hinge means connecting said sections, received in an arcuate cutaway portion of the other of said members; and means connecting said second section to the other of said members for relative limited rotation thereof, said sections being substantially parallel and in juxtaposition when said members are locked together.

7. In a device for connecting two members locking together and releasing upon relative rotation in opposite directions, the combination of: a first arcuate section fixedly attached to one of said members; a second arcuate section which is deformable by bringing together said members; hinge means connecting said sections, received in an arcuate cutaway portion of the other of said members; and means connecting said second section to the other of said members, for relative limited rotation thereof.

8. In a compact, the combination of: a base member having an opening therein; a lid member covering the opening in said base member; primary cam means associated with said base member; secondary cam means associated with said lid member, said primary and secondary cam means locking said lid member to said base member and releasing said lid member from said base member upon limited relative rotation of said lid member and said base member; a first arcuate section fixedly attached to one of said members; a second annular section which is deformable by closing of said compact, and having a projecting portion; hinge means connecting said sections, received in an arcuate cutaway portion of the other of said members for relative swinging movement thereof; an engaging means associated with said other member, engaging said projecting portion of said second section, securing together said other member and said second section during said limited rotation, and releasing said other member from said section upon further rotation; and stop means associated with said other member, engageable with said second section, limiting the relative rotation of said second section and said other member, and preventing the release of said other member from said second section.

ALLEN P. ALGIER.

REFERENCES CITED

The following references are of record in the file of this patent:

UNITED STATES PATENTS

| Number | Name | Date |
| --- | --- | --- |
| 1,201,254 | Clark | Oct. 17, 1916 |
| 1,572,208 | Huntoon, Jr. | Feb. 9, 1926 |
| 1,683,383 | Chapel | Sept. 4, 1928 |
| 1,694,185 | Leberman | Dec. 4, 1928 |
| 2,120,491 | Flower | June 14, 1938 |
| 2,377,717 | Reilly | June 5, 1945 |

FOREIGN PATENTS

| Number | Country | Date |
| --- | --- | --- |
| 474,853 | Great Britain | Nov. 9, 1937 |

Certificate of Correction

Patent No. 2,466,295.                                                         April 5, 1949.

ALLEN P. ALGIER

It is hereby certified that errors appear in the printed specification of the above numbered patent requiring correction as follows:

Column 1, line 45, after the word "drawing" insert *in*; line 52, for "Fg. 4" read *Fig. 4*; column 2, line 13, for "in a" read *is a*; line 14, for "is the" read *in the*; column 4, line 24, after "said" insert *second*;

and that the said Letters Patent should be read with these corrections therein that the same may conform to the record of the case in the Patent Office.

Signed and sealed this 11th day of October, A. D. 1949.

[SEAL]

THOMAS F. MURPHY,
*Assistant Commissioner of Patents.*